UNITED STATES PATENT OFFICE.

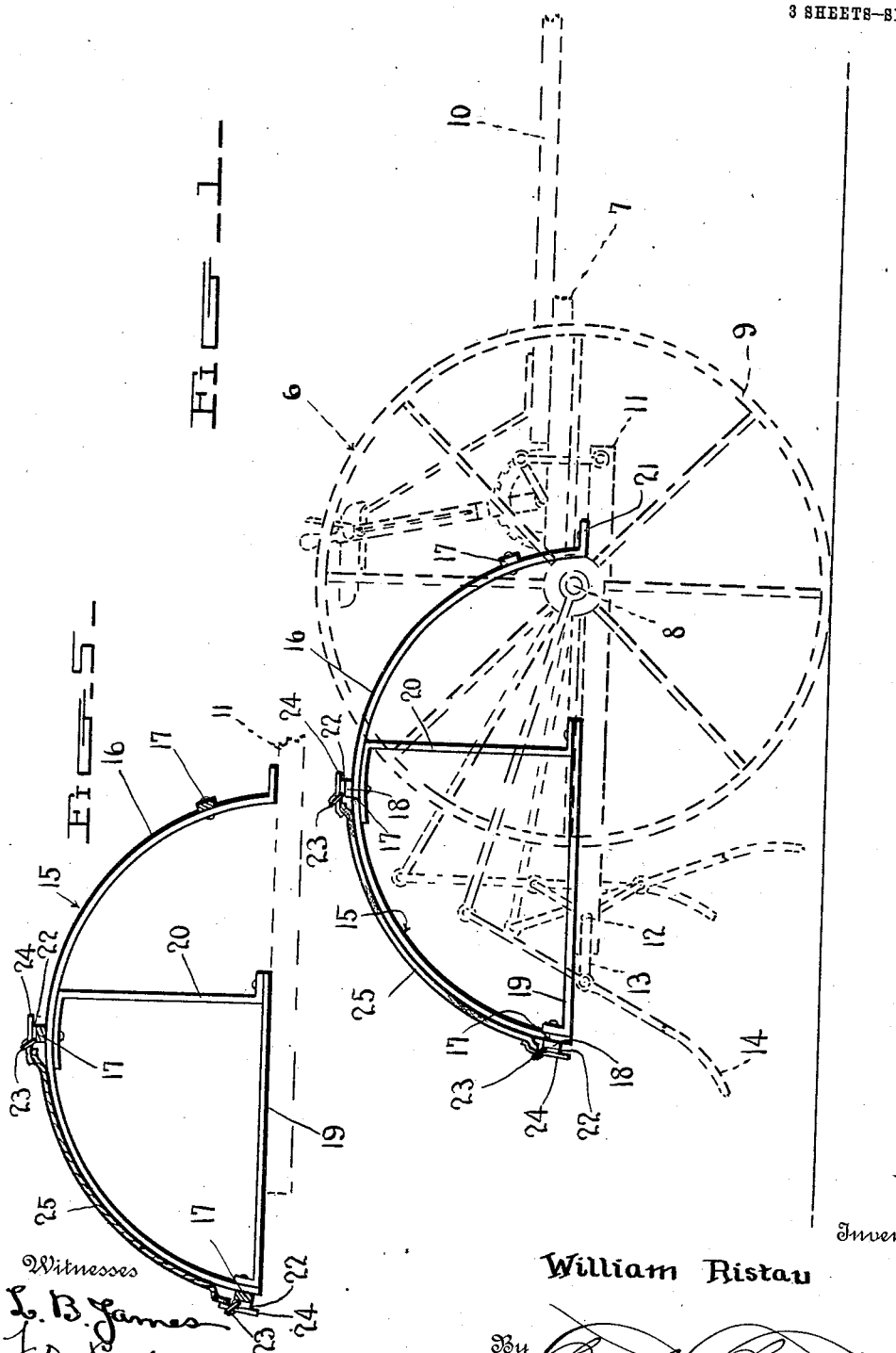

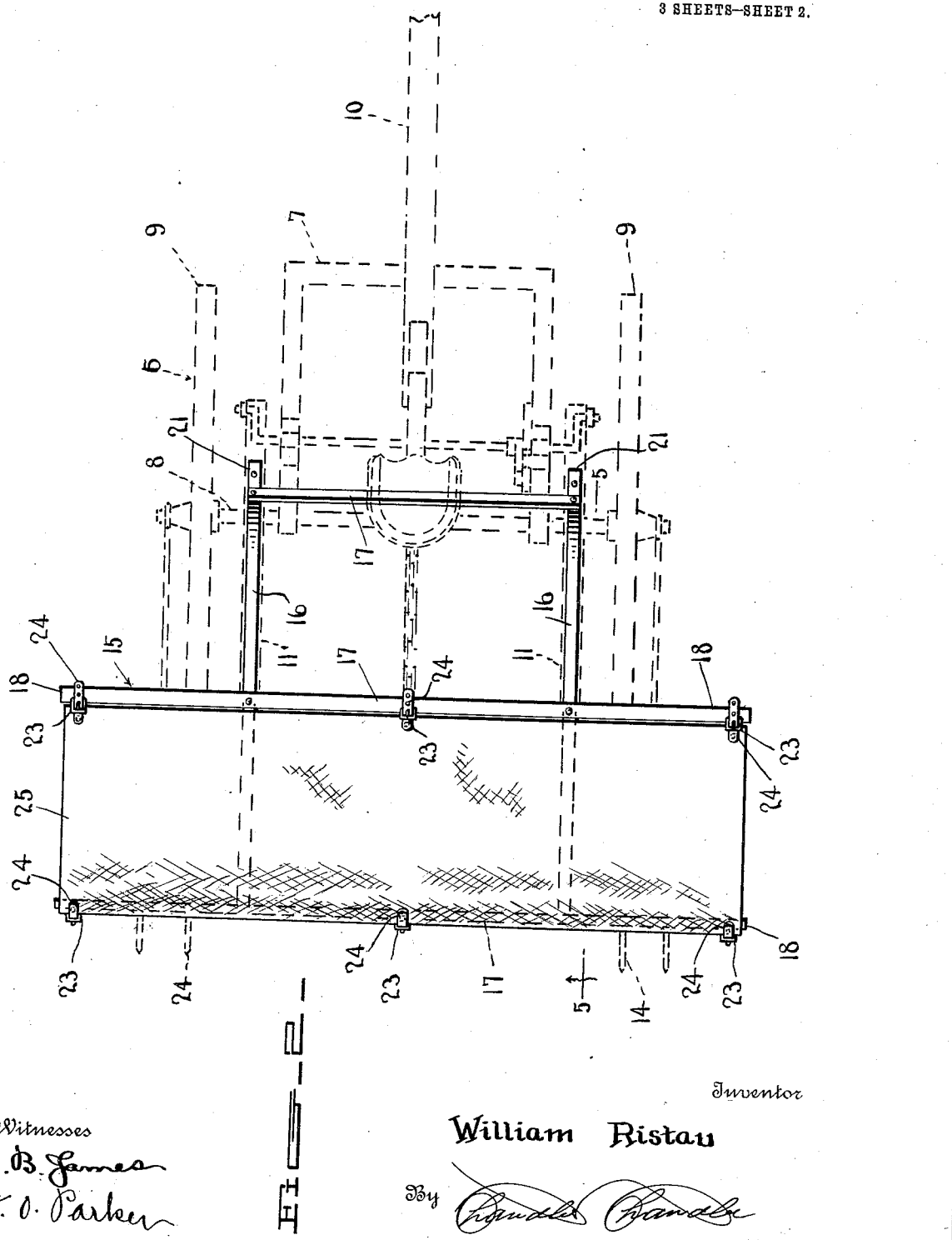

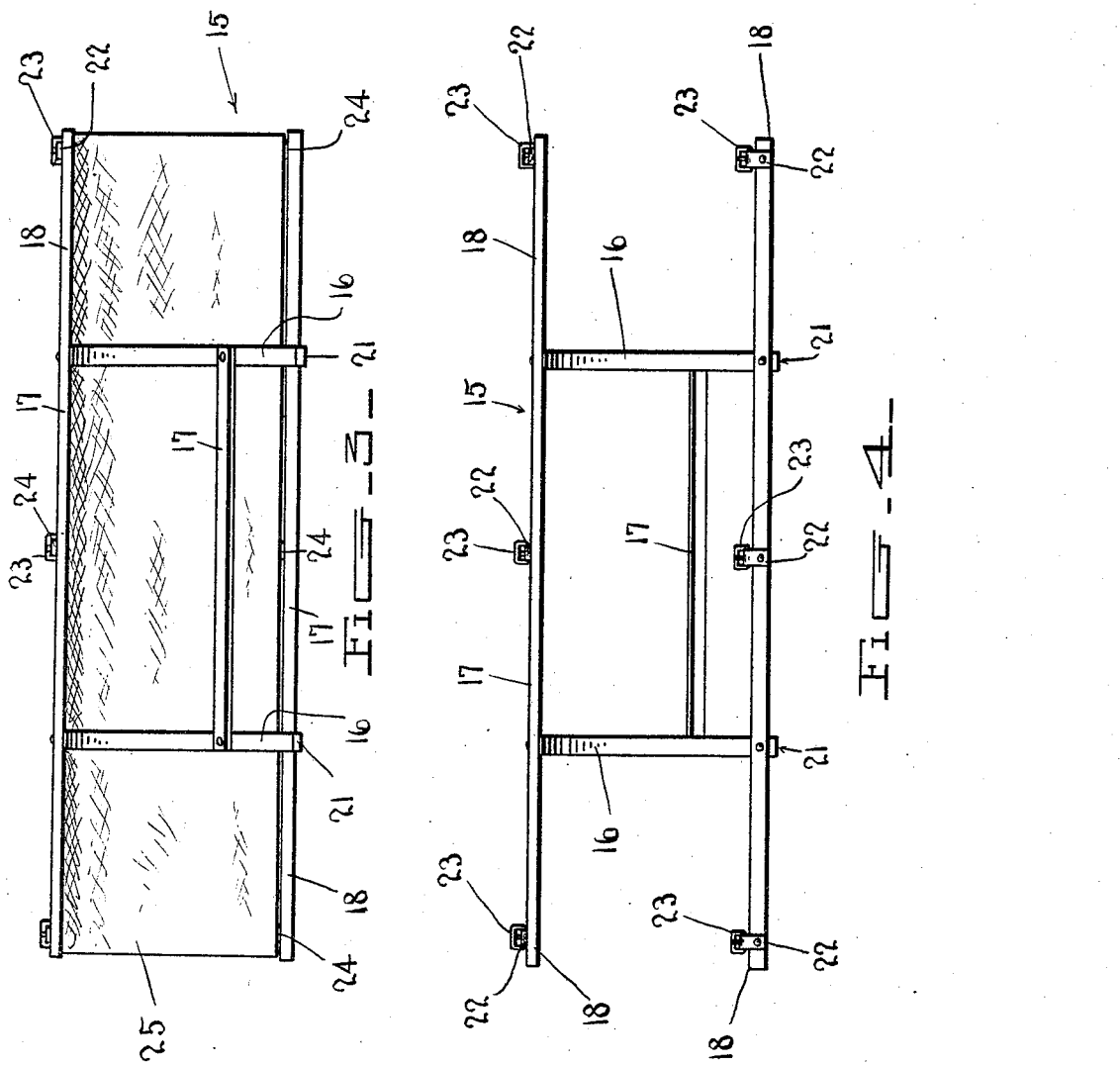

WILLIAM RISTAU, OF GENESEO, ILLINOIS.

SHIELD.

999,592.  Specification of Letters Patent.  Patented Aug. 1, 1911.

Application filed July 13, 1910. Serial No. 571,810.

*To all whom it may concern:*

Be it known that I, WILLIAM RISTAU, a citizen of the United States, residing at Geneseo, in the county of Henry, State of Illinois, have invented certain new and useful Improvements in Shields; and I do hereby declare the following to be a full, clear, and exact description of the invention, such as will enable others skilled in the art to which it appertains to make and use the same.

The invention relates to a shield and more particularly to the class of shields adapted to be attached to hay tedders.

The primary object of the invention is the provision of a shield of this character in which the hay being acted upon by the tedder will be prevented from wrapping or twisting about the cranks and the shaft actuating the forks of the hay tedder as well as the gear and driving mechanism of the latter.

Another object of the invention is the provision of a shield of this character which is capable of being readily and easily attached to a hay tedder of any conventional form and that will serve in its function to prevent the hay from getting clogged or wrapped about the crank shaft of the machine during the operation of the latter in a field.

A further object of the invention is the provision of a shield for attachment to a hay tedder which is simple in construction, thoroughly efficient in operation, durable, readily and quickly attached and detached from the machine frame and inexpensive in the manufacture.

With these and other objects in view the invention consists in the construction, combination and arrangement of parts as will be hereinafter more fully described in detail, illustrated in the accompanying drawings which disclose the preferred form of embodiment of the invention and as brought out in the claim hereunto appended.

It is to be understood that changes in proportions, material and slight modification may be made such as come properly within the scope of the claim hereunto appended without departing from the spirit of the invention or sacrificing any of its advantages.

In the drawings: Figure 1 is a side elevation of the hay tedder with a shield attached thereto and in accordance with the invention. Fig. 2 is a top plan view thereof. Fig. 3 is a front elevation of the shield removed. Fig. 4 is a rear elevation with the canvass cover in position thereon. Fig. 5 is a sectional view on the line 5—5 of Fig. 2.

Similar reference characters indicate corresponding parts throughout the several views in the drawings.

In the drawings the numeral 6 designates a hay tedder of the ordinary and conventional type comprising a thill frame 7 having mounted therein an axle 8 to the ends of which are fixed the supporting wheels 9 and projecting forwardly from the thill frame are shafts 10 for the attachment of a draft animal to the machine so that the same can be transported in a field. Hinged to the thill frame is a main frame 11 having journaled thereon a crank shaft 12 to the cranks 13 of which are connected the reciprocating and rotatable fork arms 14 which are of the usual form.

It is of course to be understood that the hay tedder machine forms no part of the present invention but is merely shown incidentally for the purpose of illustrating the manner of attachment of the shield as will be hereinafter described.

Supported by the main frame 11 of the machine 6 is an open frame structure 15 which comprises semi-circular-shaped strips 16 spaced a suitable distance from each other by cross bars 17 the latter being suitably bolted or otherwise secured to the semi-circular strips. The cross bar located adjacent the rear ends of the semi-circular strips 16 and also the intermediate bar extends as at 18 beyond the outermost strips 16 for the purpose as will be hereinafter more fully described.

Secured to the rear extremities of the semi-circular strips 16 are the upwardly bent ends of horizontally disposed supporting bars 19 the latter having their opposite ends terminating a considerable distance removed from the front extremities of the said strips 16 and to which terminals of the bars 19 are connected upright bars 20 the latter having their upper ends curved rearwardly corresponding to the arcuate formation of the strips 16 and secured thereto.

The horizontally disposed bars 19 are mounted upon the main frame and secured thereto in any suitable manner so as to dispose the frame structure over the fork arms 14 and also the crank shaft connected thereto. The forward ends of the semi-circular strips 16 are formed with securing ears 21 substantially at right angles thereto and which ears are connected in a suitable manner to the main frame 11 of the machine so that the frame structure will be rigidly mounted and supported in proper position upon the said machine.

Secured to the extensions 18 of the cross bars 17 are straps 22 carrying buckles 23 to which are detachably connected short straps 24 secured to the corners of a canvas sheet or cover 25 the latter closing the rear half of the frame structure so as to protect and prevent hay as it is acted upon by the forks of the arms 14 from wrapping or otherwise becoming tangled in the cranks of the crank shaft 12 thereby interfering with the operation of the machine.

The crank shaft 12 is actuated or driven through the medium of sprocket gear and chain connections with an axle 8 so that upon travel of the machine the supporting wheels will impart movement to the said fork arms of the machine.

It is obvious that the sheet or cover 25 connected to the frame structure will prevent the hay acted upon by the forks of the arms 14 from being thrown so as to become tangled or wrapped about the cranks of the crank shaft 12 also interfering with the sprocket gear and chain connections actuating said crank shaft.

What is claimed is—

A hay tedder comprising a wheeled frame, a rotatable shaft journaled in said frame, a series of forks arranged to be actuated by the rotation of said shaft, a pair of semi-circular strips supported upon said frame in parallel spaced relation to each other and extending over said shaft, a pair of cross bars connecting said strips adjacent their ends respectively, an intermediate cross bar connecting said strips between said first named cross bars, a plurality of buckles secured to the cross bar connecting said strips at their ends disposed at the rear of said shaft, a plurality of buckles secured to the intermediate cross bar, and a flexible cover stretched upon said strips between the intermediate cross bar and the cross bar connecting the ends of the strips disposed at the rear of said shaft, said cover being provided with a plurality of tongues detachably engaging the buckles carried by the cross bars.

In testimony whereof, I affix my signature, in presence of two witnesses.

WILLIAM RISTAU.

Witnesses:
J. A. BRADLEY,
Z. P. STEUART.

---

Copies of this patent may be obtained for five cents each, by addressing the "Commissioner of Patents, Washington, D. C."